(12) United States Patent
Seger et al.

(10) Patent No.: US 11,338,243 B2
(45) Date of Patent: May 24, 2022

(54) METHODS AND APPARATUS TO THERMALLY DESTRUCT VOLATILE ORGANIC COMPOUNDS

(71) Applicant: Illinois Tool Works Inc., Glenview, IL (US)

(72) Inventors: Ronald Seger, Prior Lake, MN (US); Ronald Chlan, Webster, MN (US); Alem Mengesha, Minneapolis, MN (US); Daniel M. Ruf, Minneapolis, MN (US); Gregory D. Yetzer, Lakeville, MN (US)

(73) Assignee: Illinois Tool Works Inc., Glenview, IL (US)

( * ) Notice: Subject to any disclaimer, the term of this patent is extended or adjusted under 35 U.S.C. 154(b) by 513 days.

(21) Appl. No.: 16/394,568

(22) Filed: Apr. 25, 2019

(65) Prior Publication Data

US 2019/0329178 A1  Oct. 31, 2019

Related U.S. Application Data

(60) Provisional application No. 62/663,460, filed on Apr. 27, 2018.

(51) Int. Cl.
*B01D 53/34* (2006.01)
*B01D 53/44* (2006.01)
(Continued)

(52) U.S. Cl.
CPC ........... *B01D 53/44* (2013.01); *B01D 53/346* (2013.01); *B01D 53/76* (2013.01); *H05B 1/0297* (2013.01); *H05B 3/42* (2013.01); *B01D 2258/0216* (2013.01)

(58) Field of Classification Search
CPC .......... B01D 2258/0216; B01D 53/346; B01D 2257/708; B01D 53/76; B01D 53/72;
(Continued)

(56) References Cited

U.S. PATENT DOCUMENTS 3,851,147 A  11/1974  Hachmeister
3,883,721 A  5/1975  Paulson
(Continued)

FOREIGN PATENT DOCUMENTS

CN  21 0 206 399 U  *  3/2020  ............. B01D 53/62
CN  21 3 930 970 U  *  8/2021  ............... F23G 7/06
(Continued)

OTHER PUBLICATIONS

Int'l Search Report and Written Opinion Appln No. PCT/US2019/029437 dated Jul. 8, 2019.

*Primary Examiner* — Timothy C Vanoy
(74) *Attorney, Agent, or Firm* — McAndrews, Held & Malloy, Ltd.

(57) ABSTRACT

Methods and apparatus to thermally destruct volatile organic compounds are disclosed. An example thermal oxidizer for a furnace includes: an oxidation chamber comprising an inlet configured to receive exhaust gases from a furnace and an outlet configured to output resultant gases; and a plurality of heating elements within the oxidation chamber configured to heat the exhaust gases to oxidize one or more components of the exhaust gases between the inlet and the outlet to result in the resultant gases, the plurality of heating elements comprising resistive heating elements forming coils having respective axes, the plurality of heating elements being oriented within the oxidation chamber such that the axes of the coils are transverse to an exhaust gas flow direction from the inlet to the outlet of the oxidation chamber.

15 Claims, 3 Drawing Sheets

(51) Int. Cl.
*B01D 53/76* (2006.01)
*H05B 1/02* (2006.01)
*H05B 3/42* (2006.01)

(58) Field of Classification Search
CPC . B01D 53/44; H05B 3/62; H05B 3/42; H05B 1/0297; F23J 2900/13002; F23J 15/02; F23N 2227/38
See application file for complete search history.

(56) References Cited

U.S. PATENT DOCUMENTS

| | | | |
|---|---|---|---|
| 8,747,528 B2 * | 6/2014 | Hung | B01D 53/0438 96/125 |
| 9,316,410 B2 * | 4/2016 | Meirav | F24F 1/0326 |
| 9,427,728 B2 * | 8/2016 | Sidheswaran | B01J 35/1028 |
| 2004/0045438 A1 * | 3/2004 | Place | B01D 53/0438 95/141 |
| 2011/0212010 A1 | 9/2011 | Bell | |
| 2012/0141351 A1 * | 6/2012 | Denzer | B01D 53/8668 423/400 |
| 2015/0298043 A1 * | 10/2015 | Meirav | B01D 53/0454 95/11 |

FOREIGN PATENT DOCUMENTS

| | | | | |
|---|---|---|---|---|
| JP | 2004 041 884 A | * | 2/2004 | H05H 1/24 |
| JP | 2004 271 684 A | * | 9/2004 | G03G 15/20 |
| KR | 2009 0 107 225 | * | 10/2009 | Y02A 50/20 |
| KR | 100 995 524 B1 | * | 11/2010 | Y02A 50/20 |

* cited by examiner

METHODS AND APPARATUS TO THERMALLY DESTRUCT VOLATILE ORGANIC COMPOUNDS

BACKGROUND

This disclosure relates to exhaust management and, more particularly, to methods and apparatus to thermally destruct volatile organic compounds.

SUMMARY

Methods and apparatus to thermally destruct volatile organic compounds are disclosed, substantially as illustrated by and described in connection with at least one of the figures, as set forth more completely in the claims.

DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Where appropriate, similar or identical reference numbers are used to refer to similar or identical components.

DETAILED DESCRIPTION

Figure 1:
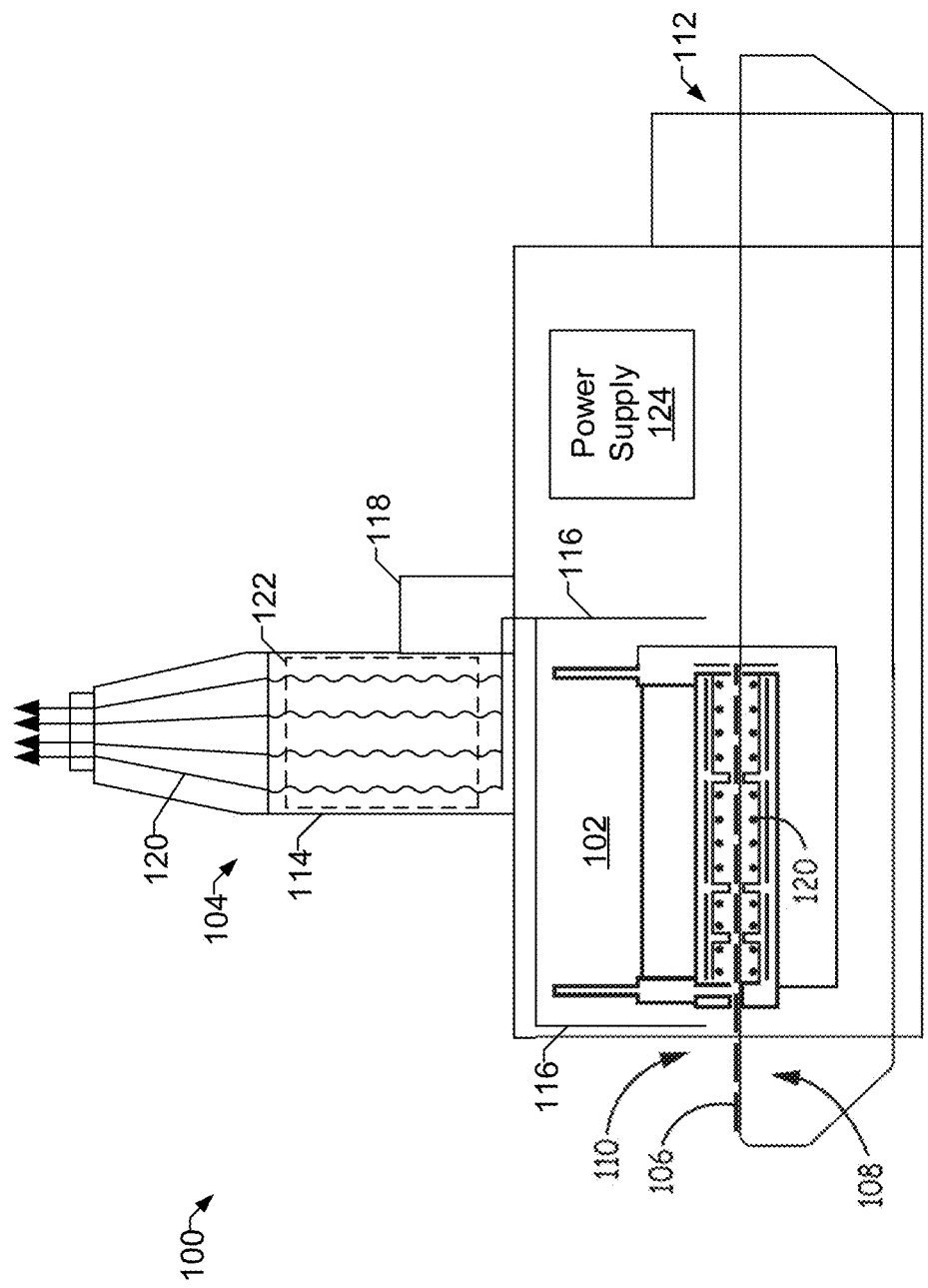
FIG. 1 is a side plan view of an example of photovoltaic cell firing furnace including a thermal oxidizer for oxidizing volatile organic compounds present in furnace exhaust gas, in accordance with aspects of this disclosure.

Some conventional exhaust gas oxidizers use a vertical heater arrangement including perforated plates that are perpendicular to the airflow. In high throughput applications, the perforated plates may clog up with material compounds that outgasses from the products being fired. In some cases, the perforated plates are not sufficiently resilient, and are prone to breakage during transport.

Disclosed exhaust gas oxidizers for firing furnaces omit the perforated plates while providing the same or better oxidation performance, particularly in high-throughput applications. Some example thermal oxidizers include an oxidation chamber having an inlet configured to receive exhaust gases from a furnace and an outlet configured to output resultant gases. The example thermal oxidizers further include heating elements within the oxidation chamber, which are configured to heat the exhaust gases to oxidize one or more components of the exhaust gases (e.g., volatile organic compounds, or VOCs) between the inlet and the outlet to produce the resultant gases. The heating elements include resistive heating elements forming coils having respective axes, and are oriented within the oxidation chamber such that the axes of the coils are transverse to a exhaust gas flow direction from the inlet to the outlet of the oxidation chamber.

In some examples, the heating elements are configured to partially obstruct multiple cross-sections of the oxidation chamber, and/or create a tortuous path from the inlet to the outlet for flow of the exhaust gases.

The terms "photovoltaic cell" and "solar cell" are used interchangeably throughout this patent.

Disclosed example thermal oxidizers include: an oxidation chamber comprising an inlet configured to receive exhaust gases from a furnace and an outlet configured to output resultant gases; and a plurality of heating elements within the oxidation chamber configured to heat the exhaust gases to oxidize one or more components of the exhaust gases between the inlet and the outlet to result in the resultant gases, the plurality of heating elements including resistive heating elements forming coils having respective axes, the plurality of heating elements being oriented within the oxidation chamber such that the axes of the coils are transverse to an exhaust gas flow direction from the inlet to the outlet of the oxidation chamber.

In some example thermal oxidizers, the heating elements are configured to partially obstruct multiple cross-sections of the oxidation chamber. In some examples, the heating elements are configured to create a tortuous path from the inlet to the outlet for flow of the exhaust gases. In some such examples, the heating elements are configured to create the tortuous path from the inlet to the outlet without the use of baffling.

In some example thermal oxidizers, the heating elements are configured to heat the exhaust gases to a temperature sufficient to oxidize the one or more components of the exhaust gases without the use of a catalyst. In some examples, the heating elements are configured to heat the oxidation chamber to at least 700° Celsius and to provide a dwell time for the exhaust gases of at least 0.2 seconds within the oxidation chamber.

In some examples, the heating elements include cores, in which the coils are wrapped around the respective cores. Example cores include at least one of ceramic, galvanized steel, stainless steel, or brass. Some example thermal oxidizers further include a temperature sensor configured to measure a temperature of at least one of the exhaust gas or the resultant gas, and a controller configured to control at least one of a power applied to the plurality of heating elements or an airflow speed of the exhaust gas.

Disclosed example firing furnaces for solar cell production include: a heating chamber configured to fire solar cells within the heating chamber; and a thermal oxidizer configured to receive exhaust gases from the furnace. The thermal oxidizer includes: an oxidation chamber comprising an inlet configured to receive exhaust gases from a furnace and an outlet configured to output resultant gases; and a plurality of heating elements within the oxidation chamber configured to heat the exhaust gases to oxidize one or more components of the exhaust gases between the inlet and the outlet to result in the resultant gases, the plurality of heating elements comprising resistive heating elements forming coils having respective axes, the plurality of heating elements being oriented within the oxidation chamber such that the axes of the coils are transverse to an exhaust gas flow direction from the inlet to the outlet of the oxidation chamber.

Some example firing furnaces further include a plurality of conveyors configured to convey separate sets of wafers through the heating chamber, in which each of the conveyors is thermally isolated from the others of the plurality of conveyors within the heating chamber. In some examples, the thermal oxidizer is configured to receive the exhaust gases from the wafers on the plurality of conveyors.

In some examples, the thermal oxidizer includes a plurality of oxidation chambers configured to receive the exhaust gases from respective ones of the plurality of conveyors. In some examples, the thermal oxidizer is configured to receive the exhaust gas immediately and directly from the heating chamber. In some examples, the plurality of heating elements are configured to heat the exhaust gases to a temperature sufficient to oxidize the one or more components of the exhaust gases without the use of a catalyst.

FIG. 1 is a side plan view of an example firing furnace 100 having a heating chamber 102 and an exhaust stack 104. The example furnace 100 shown in FIG. 1 is suitable for use in the firing of metal contacts on photovoltaic devices (such as solar cells) 106. Wafers of photovoltaic cells (also referred to herein as "wafers" or "solar cells") 106 are transported by a conveyor 108 (e.g., a belt) into an entry 110 formed in the firing furnace 100. In some examples, the firing furnace 100 includes a dryer that operates at a lower temperature than the heating chamber 102. The exhaust stack 104 may be associated with either or both of the heating chamber 102 and the dryer.

After processing, the wafers 106 are transported by the conveyor 108 out of an exit 112 formed in the firing furnace 100. More specifically, in the exemplary embodiment shown in FIG. 1, wafers 106 pass through the entry 110 into the heating chamber 102, then pass through the heating chamber 102, and then are conveyed out of the furnace 100 through the exit 112. The heating chamber 102 supplies an ambient temperature and/or radiant heating suitable for firing the wafers 106 within the heating chamber 102 (e.g., within the time allotted for the wafers 106 to be conveyed through the heating chamber 102).

Although the following description refers to a single conveyor 108 for ease of explanation, it is to be understood that one, two, or more parallel conveyors 108 can be used at the same time in the same furnace 100. Each separate conveyor 108 is also referred to as a "lane." In one implementation, the furnace 100 and the conveyor 108 are configured so that each conveyor 108 (and the solar cells 106 thereon) are thermally isolated from one another in order to reduce lane-to-lane influence.

As noted above, the furnace 100 is used for the firing of metal contacts on photovoltaic cells 106. Front and back side metal contacts of photovoltaic cells 106 are initially formed by an electrically conductive metallized paste or ink that is applied, for example, by a screen printing, inkjet spray or aerosol spray process to silicon wafers. Commonly, the front side contact extends in a grid pattern, and the backside contact extends continuously.

After the metallized paste has been applied to the silicon wafers 106, the wafers 106 are dried. The wafers 106 are dried in order to remove any remaining volatile organic compounds (VOCs) (for example, solvent) used in the screen-printing or other paste-application processes. The exhaust stack 104 includes a thermal oxidizer assembly 122 to oxidize VOCs that are vaporized in the heating chamber 102 before the VOCs are permitted to exit the furnace 100.

Although one exhaust stack 104 is illustrated for the example furnace 100, more exhaust stacks may be provided to improve the rate of VOC oxidation, which enables a higher rate of throughput (e.g., greater conveyor speeds, additional conveyors, etc.) for the furnace 100. Furthermore, the exhaust stack 104 and/or the thermal oxidizer assembly 122 may be used to oxidize VOCs for other types of VOC-emitting apparatus. For example, multiple-lane furnaces may use an exhaust stack 104 having multiple thermal oxidizer assemblies (e.g., one thermal oxidizer assembly per lane) within a same plenum, or using multiple plenums.

The exhaust stack 104 is mounted to the furnace 100 in proximity to an inlet of the heating chamber 102 and/or to the outlet of the heating chamber 102. A guard may be attached to an exterior of the furnace 100 to provide an insulated sidewall 114 that surrounds the thermal oxidizer assembly 122. The thermal oxidizer assembly 122 is in direct fluid communication with an interior of the furnace 100. The insulated sidewall 114 may be formed from an aluminum casing and lined with an alumina/silica insulation. Other materials may be used to form the sidewall, such as an aluminized steel casing and/or stainless steel.

The example exhaust stack 104 receives the exhaust gas 116 immediately and/or directly from the heating chamber 102. Locating the thermal oxidizer assemblies 122 in close proximity to the heating chamber 102 can provide significant advantages. Destroying VOCs closer to where they are generated and soon after they are generated reduces the damage that such VOCs can cause. For instance, if VOC-laden gas must travel any distance through one or more pipes to VOC destruction equipment, inevitably some of the VOCs will condense within the pipe(s). In such instances, the condensed VOCs must be removed from the pipe(s) through costly and labor-intensive processes. Another danger faced by systems that transport VOC-laden gas from the heating chamber 102 to VOC destruction equipment is that the VOCs can drip back into the furnace 100 and cause a fire.

To ensure complete destruction of VOCs in the exhaust gas, conventional thermal oxidizers had a limited cross-section through which the exhaust gases were permitted to flow, thereby increasing the dwell time of the exhaust gases to sufficiently ensure destruction. However, conventional thermal oxidizers have the potential to clog, thereby reducing the exhaust capacity and/or increasing the concentration of VOCs in the furnace. Disclosed thermal oxidizer assemblies 122 improve the cross-sectional area through which the exhaust gases may travel through the thermal oxidizer assembly 122, while maintaining a sufficient dwell time of the exhaust gases to oxidize the VOCs.

A power supply 124 provides electrical power for the thermal oxidizer assembly 122. In some examples, the power supply 124 provides power for all subsystems in the furnace 100, such as the heating chamber 102, the heating elements 120, the conveyor 108, and/or any cooling, annealing, and/or other power used by the furnace 100.

The example thermal oxidizer assembly 122 receives exhaust gas 116 from the heating chamber 102 via a plenum 118. The exhaust gas 116 enters a first end of the thermal oxidizer assembly 122, travels through the thermal oxidizer assembly 122 while being heated by heating elements, and the resulting gases 120 are expelled from the exhaust stack 104. In some examples, the exhaust stack 104 includes a venturi stack 118 to draw the exhaust gases 116 through the thermal oxidizer assembly 122 with a natural draft. In other examples, the exhaust stack 104 includes a motor and fan wheel to urge the exhaust gases 116 through the thermal oxidizer assembly 122. The motor may be controlled to control the air speed and, thus, the dwell time of the exhaust gases 116 within the exhaust stack 104.

In some examples, the exhaust stack 104 expels the resulting gases 120 (e.g., VOC-free gas) to exhaust duct-work of a facility in which the furnace 100 is installed.

Figure 2:
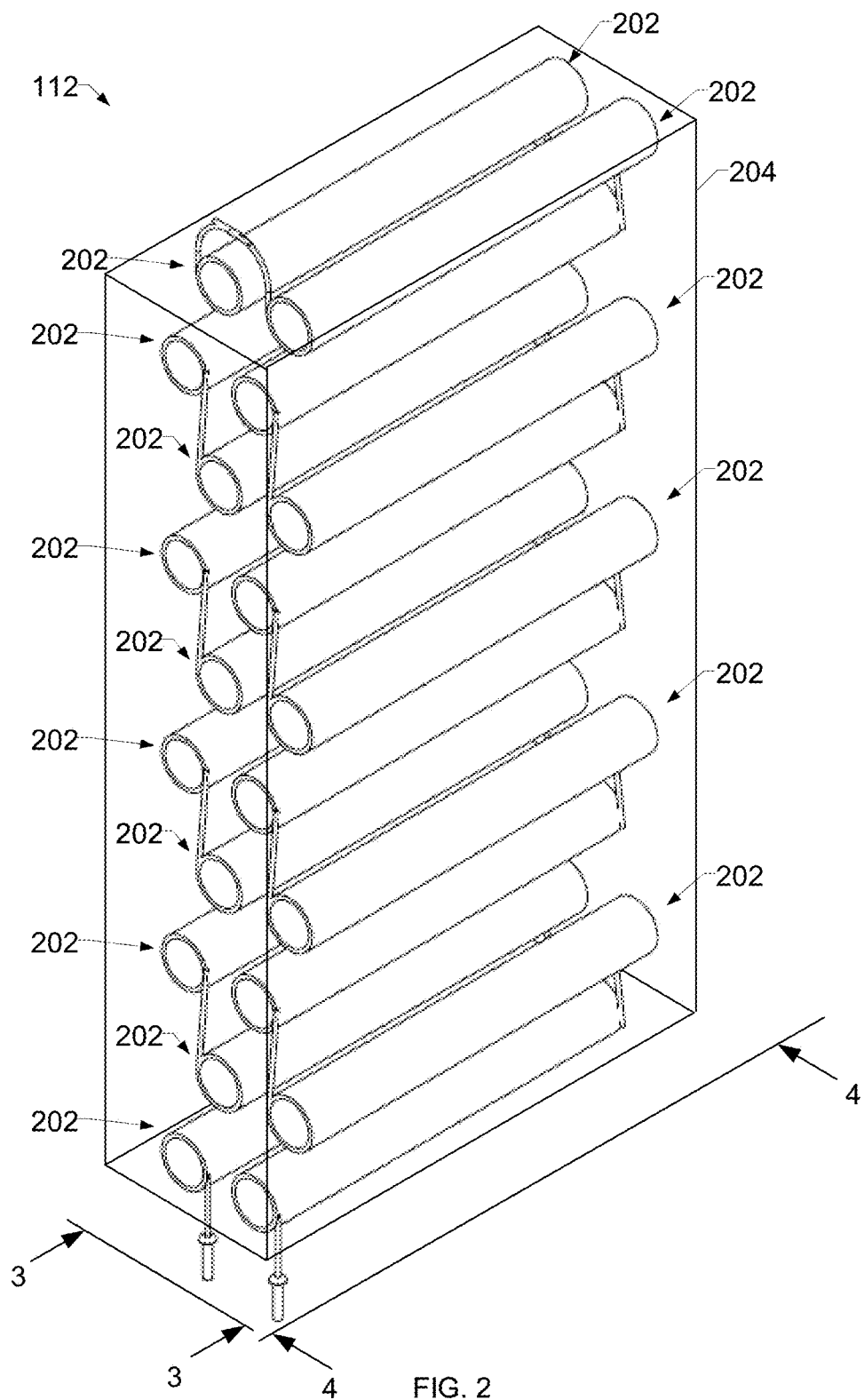
FIG. 2 is a perspective view of an arrangement of heating elements that may be used to implement the thermal oxidizer of FIG. 1.
Figure 3:
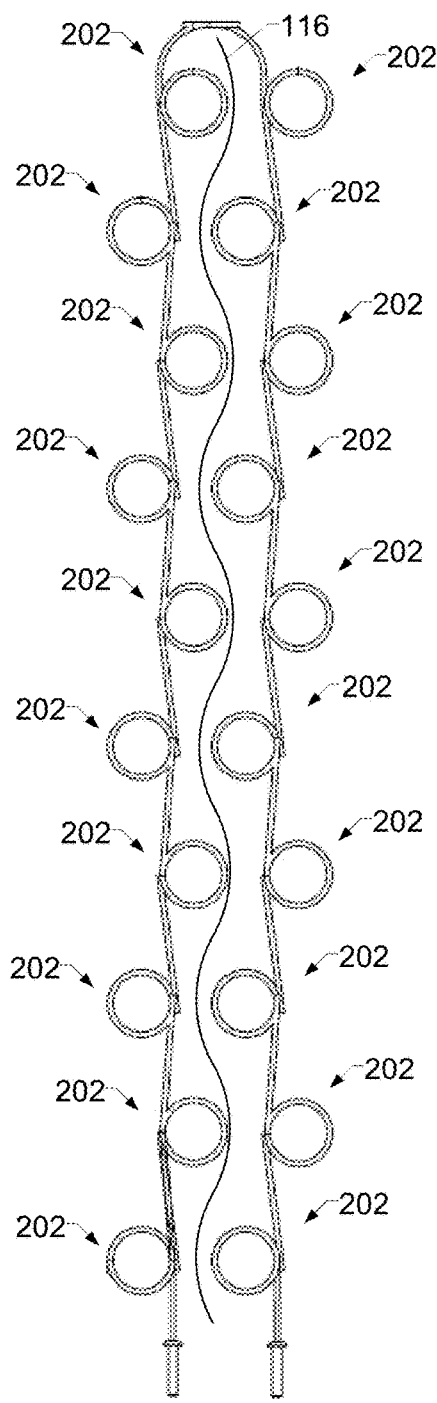
FIG. 3 is a side view of the example heating elements of FIG. 2.
Figure 4:
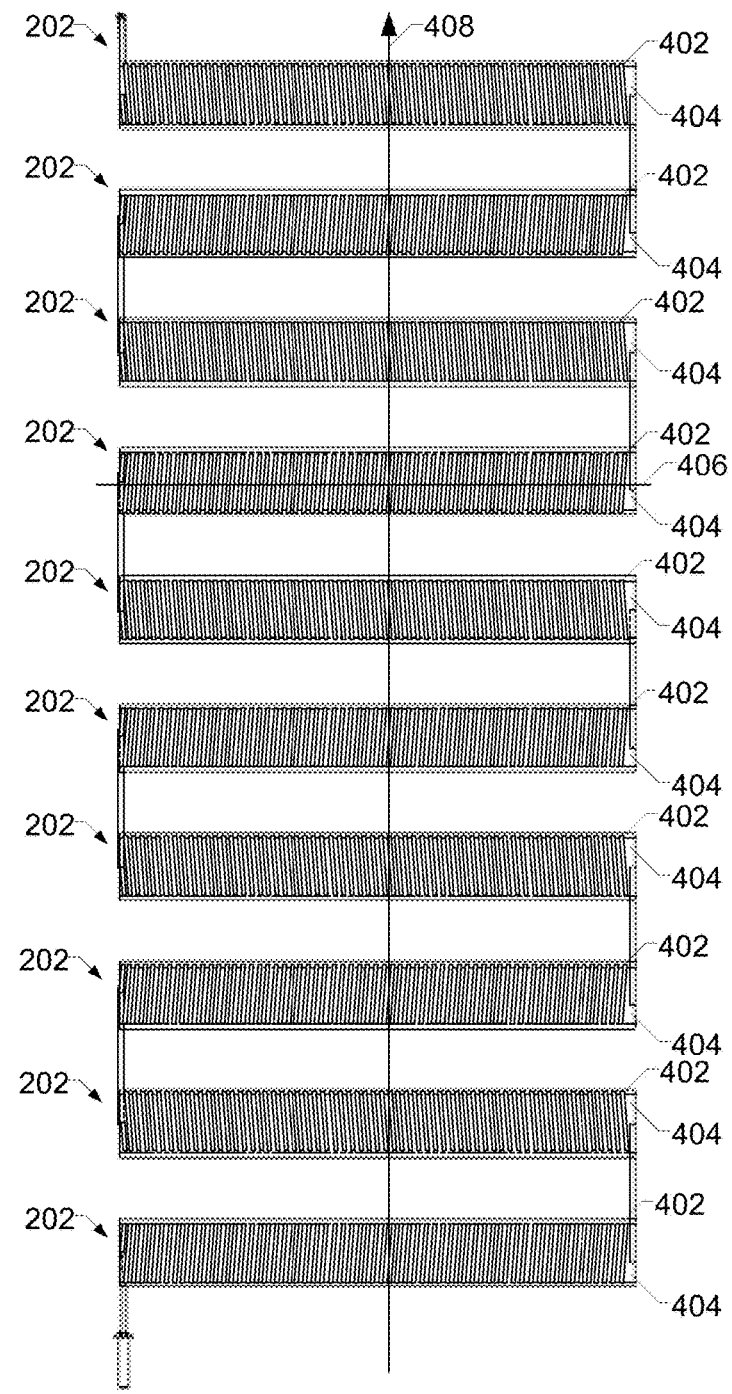
FIG. 4 is another view of the example heating elements of FIG. 2.

FIG. 2 is a perspective view of an arrangement of heating elements 202 that may be used to implement the thermal oxidizer assembly 122 of FIG. 1. FIG. 3 is a side view of the example heating elements 202 of FIG. 2. FIG. 4 is another view of the example heating elements 202 of FIG. 2. As illustrated in FIG. 4, each of the example heating elements 202 of FIG. 2 includes a coil of resistive heating material 402, such as Chromel wire, configured to generate heat when a current is applied to the coil. Other resistive heating materials may be used. The example heating elements 202 are coupled in series. However, the heating elements 202 may be coupled in any combination of series and/or parallel connections. Using one or more parallel heating elements 202 enables temperature control of different sets of the parallel heating elements 202.

In the illustrated example, the resistive heating material 402 is wrapped around a core 404 to provide structure and/or increase thermal mass in the thermal oxidizer assembly 122. The cores 404 may be hollow or solid, and may be constructed of ceramic, galvanized steel, stainless steel, brass, and/or any other materials. The example resistive heating material 402 forms a coil around the core 404. The heating elements 202 are oriented such that a longitudinal axis 406 of the coil is transverse to the general direction of flow 408 of the exhaust gas 116 through the oxidation chamber 204.

The heating elements 202 of the illustrated example receive the exhaust gas 116 from the heating chamber 102 via the plenum 118. The heating elements 202 heat the exhaust gas 116 to a sufficiently high temperature, based on the anticipated dwell time of the exhaust gas 116 traveling through the heating chamber, to oxidize substantially all VOCs present in the exhaust gas 116.

As illustrated in FIG. 2, the heating elements 202 are housed in a oxidation chamber 204. The oxidation chamber 204 may be constructed of sheet metal, and insulated from an exterior of the exhaust stack 104 by the insulated sidewall 114. The insulated sidewall 114 may be constructed using, for example, an RSLE-57 ceramic material, a CS-85 ceramic material, and/or any other electrically and thermally insulating structural material, to enable attachment or anchoring of the heating elements 202 within the oxidation chamber 204. The insulated sidewall 114 may include additional thermal insulation.

The example exhaust stack 104 may include one or more sensors to monitor the temperature of the thermal oxidizer assembly 122 and/or temperatures of the heating elements 202. Additionally or alternatively, the exhaust stack may include an airflow switch to monitor airflow. An airflow switch may be located at a top (e.g., outlet) of the exhaust stack 104 to measure whether a facility-based exhaust is present. The furnace 100 may include control circuitry configured to perform closed-loop control of the power supply 124, the heating elements 202, an exhaust fan, dampers, and/or any other components of the exhaust stack for temperature control and/or throughput of the exhaust stack. The temperature sensors may also be used to shut down the furnace 100 in response to detecting a temperature above an overtemperature threshold.

In some examples, the exhaust stack includes sensors to measure the concentration of VOCs and/or products of oxidizing VOCs. The sensors may be positioned at the inlet to the exhaust stack (e.g., in the plenum 118) and/or at the outlet from the exhaust stack 104 to determine whether the electrical power should be increased, maintained, or decreased to substantially fully oxidize VOCs entering the exhaust stack.

The example exhaust stack 104 and heating elements 202 of FIGS. 1-4 are configured to oxidize or combust VOCs without the use of catalysts (e.g., by heating the exhaust gases 116 to at least a threshold temperature for at least a threshold time, based on the types of VOCs expected). In some examples, the exhaust stack 104 has a height (e.g., a distance from the intake of the exhaust gases 116 to the outlet of the exhaust stack 104) of less than 1.22 meters, which, in combination with the airflow speed, affects the dwell time of the exhaust gases 116. For example, to oxidize or combust the VOCs in the exhaust gases 116 without a catalyst, the exhaust stack 104 and the heating elements 202 may heat the oxidation chamber 204 to at least 700° Celsius and provide a dwell time for the exhaust gases 116 of at least 0.2 seconds within the oxidation chamber 204. In some examples, the exhaust stack 104 and the heating elements 202 may provide a dwell time of at least 0.3 seconds, a dwell time of at least 0.4 seconds, or a dwell time of at least 0.5 seconds.

As illustrated in FIGS. 2-4, the heating elements 202 are oriented and arranged so as to create a tortuous path (e.g., illustrated in FIG. 3) for the exhaust gases 116 through the oxidation chamber 204 around the heating elements 202. The tortuous path created by the heating elements 202, in combination with a natural draft and/or forced air, to pull the exhaust gases 116 through the oxidation chamber 204, may result in at least a threshold dwell time for the exhaust gases 116. The structures, locations, and orientations of the heating elements 202 enable the heating elements 202 to create the tortuous path without the use of baffling, although in other examples baffles may be used. In some other examples, the exhaust stack 104 may be configured to utilized one or more catalyst media to reduce the temperatures at which the heating elements 202 are required to operate.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A thermal oxidizer for a furnace, the thermal oxidizer comprising:
   an oxidation chamber comprising an inlet configured to receive exhaust gases from a furnace and an outlet configured to output resultant gases; and
   a plurality of heating elements within the oxidation chamber configured to heat the exhaust gases to oxidize one or more components of the exhaust gases between the inlet and the outlet to result in the resultant gases, the plurality of heating elements comprising resistive heating elements forming coils having respective axes, the plurality of heating elements being oriented within the oxidation chamber such that the axes of the coils are transverse to an exhaust gas flow direction from the inlet to the outlet of the oxidation chamber.

2. The thermal oxidizer of claim 1, wherein the plurality of heating elements are configured to partially obstruct multiple cross-sections of the oxidation chamber.

3. The thermal oxidizer of claim 1, wherein the plurality of heating elements are configured to create a tortuous path from the inlet to the outlet for flow of the exhaust gases.

4. The thermal oxidizer of claim 3, wherein the plurality of heating elements are configured to create the tortuous path from the inlet to the outlet without the use of baffling.

5. The thermal oxidizer of claim 1, wherein the plurality of heating elements are configured to heat the exhaust gases to a temperature sufficient to oxidize the one or more components of the exhaust gases without the use of a catalyst.

6. The thermal oxidizer of claim 5, wherein the plurality of heating elements are configured to heat the oxidation chamber to at least 700° Celsius and to provide a dwell time for the exhaust gases of at least 0.2 seconds within the oxidation chamber.

7. The thermal oxidizer of claim 1, wherein the plurality of heating elements comprise cores, in which the coils are wrapped around the respective cores.

8. The thermal oxidizer of claim 7, wherein the cores comprise at least one of ceramic, galvanized steel, stainless steel, or brass.

9. The thermal oxidizer of claim 1, further comprising a temperature sensor configured to measure a temperature of at least one of the exhaust gas or the resultant gas, and a controller configured to control at least one of a power applied to the plurality of heating elements or an airflow speed of the exhaust gas.

10. A firing furnace for solar cell production, the firing furnace comprising:
   a heating chamber configured to fire solar cells within the heating chamber; and
   a thermal oxidizer configured to receive exhaust gases from the furnace, the thermal oxidizer comprising:
      an oxidation chamber comprising an inlet configured to receive exhaust gases from a furnace and an outlet configured to output resultant gases; and
      a plurality of heating elements within the oxidation chamber configured to heat the exhaust gases to oxidize one or more components of the exhaust gases between the inlet and the outlet to result in the resultant gases, the plurality of heating elements comprising resistive heating elements forming coils having respective axes, the plurality of heating elements being oriented within the oxidation chamber such that the axes of the coils are transverse to an exhaust gas flow direction from the inlet to the outlet of the oxidation chamber.

11. The firing furnace of claim 10, further comprising a plurality of conveyors configured to convey separate sets of wafers through the heating chamber, wherein each of the conveyors is thermally isolated from the others of the plurality of conveyors within the heating chamber.

12. The firing furnace of claim 11, wherein the thermal oxidizer is configured to receive the exhaust gases from the wafers on the plurality of conveyors.

13. The firing furnace of claim 11, wherein the thermal oxidizer comprises a plurality of oxidation chambers configured to receive the exhaust gases from respective ones of the plurality of conveyors.

14. The firing furnace of claim 11, wherein the thermal oxidizer is configured to receive the exhaust gas immediately and directly from the heating chamber.

15. The firing furnace of claim 11, wherein the plurality of heating elements are configured to heat the exhaust gases to a temperature sufficient to oxidize the one or more components of the exhaust gases without the use of a catalyst.

* * * * *